US008463188B2

(12) United States Patent
Gan et al.

(10) Patent No.: US 8,463,188 B2
(45) Date of Patent: Jun. 11, 2013

(54) METHOD AND APPARATUS FOR SPECTRUM ACCESS OF SECONDARY USERS IN COGNITIVE RADIO SYSTEM

(75) Inventors: Xiaoying Gan, Shenzhen (CN); Xin Long, Shenzhen (CN); Wei Zhang, Shenzhen (CN); Yuan Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 810 days.

(21) Appl. No.: 12/649,926

(22) Filed: Dec. 30, 2009

(65) Prior Publication Data

US 2010/0173587 A1  Jul. 8, 2010

(30) Foreign Application Priority Data

Jan. 6, 2009  (CN) .......................... 2009 1 0001371

(51) Int. Cl.
H04B 17/00 (2006.01)
(52) U.S. Cl.
USPC ............. 455/62; 455/509; 455/512; 455/513; 455/63.1; 370/310; 370/329; 370/330; 370/431; 370/437
(58) Field of Classification Search
USPC ........... 455/62, 509, 512, 513, 63.1; 370/310, 370/329, 330, 431, 437
See application file for complete search history.

(56) References Cited

U.S. PATENT DOCUMENTS

| 6,990,092 | B1 * | 1/2006 | Siala | 370/347 |
| 7,412,020 | B1 * | 8/2008 | Misra et al. | 375/377 |
| 7,733,989 | B2 * | 6/2010 | Guey | 375/340 |
| 2002/0168017 | A1 * | 11/2002 | Berthet et al. | 375/267 |
| 2003/0086371 | A1 * | 5/2003 | Walton et al. | 370/235 |
| 2004/0111741 | A1 * | 6/2004 | DePietro | 725/34 |
| 2004/0213361 | A1 * | 10/2004 | Chen et al. | 375/340 |
| 2007/0076669 | A1 * | 4/2007 | Boroujeny et al. | 370/335 |

(Continued)

FOREIGN PATENT DOCUMENTS

| CN | 1265255 A | 8/2000 |
| CN | 1592166 A | 3/2005 |

(Continued)

OTHER PUBLICATIONS

Xin Long et al, An Estimation Algorithm of Channel State Transition Probabilities for Cognitive Radio Systems, Cognitive Radio Oriented Wireless Networks and Communications, 2008, Crowncom 2008, 3rdInternational Conference on IEEE Piscataway, NJ, USA, pp. 14, XP031285109 (May 15, 2008).*

(Continued)

*Primary Examiner* — Nay A Maung
*Assistant Examiner* — Erica Fleming-Hall
(74) *Attorney, Agent, or Firm* — Leydig, Voit & Mayer, Ltd.

(57) ABSTRACT

A method and apparatus for spectrum access of secondary users in a cognitive radio system are provided. The method includes: estimating parameters of a primary channel according to the Markov model used by the primary channel; selecting a primary channel that has the largest available bandwidth according to the estimated channel parameters when multiple primary channels exist; detecting the selected primary channel; and accessing the primary channel to transmit data when the channel is idle. Therefore, an optimum primary channel can be selected from multiple primary channels by estimating channel parameters to satisfy high data transmission requirements and improve system performance.

17 Claims, 4 Drawing Sheets

U.S. PATENT DOCUMENTS

| | | | | |
|---|---|---|---|---|
| 2007/0110201 | A1* | 5/2007 | Mergen et al. | 375/350 |
| 2007/0127602 | A1* | 6/2007 | Guey | 375/340 |
| 2008/0160927 | A1* | 7/2008 | Bar-Ness et al. | 455/73 |
| 2008/0165734 | A1* | 7/2008 | Hart et al. | 370/330 |
| 2009/0074038 | A1* | 3/2009 | Lentmaier et al. | 375/148 |
| 2009/0243927 | A1* | 10/2009 | Krach et al. | 342/357.12 |
| 2010/0173586 | A1* | 7/2010 | Mchenry et al. | 455/62 |
| 2010/0240407 | A1* | 9/2010 | Park et al. | 455/512 |
| 2010/0246825 | A1* | 9/2010 | Baras et al. | 380/270 |
| 2011/0191281 | A1* | 8/2011 | Park et al. | 706/52 |

FOREIGN PATENT DOCUMENTS

| | | |
|---|---|---|
| CN | 101242333 A | 8/2008 |
| CN | 101331690 A | 12/2008 |
| WO | WO 2005/071903 A1 | 8/2005 |
| WO | WO 2006065434 A2 | 6/2006 |

OTHER PUBLICATIONS

Quianchuan Zhao et al., Opportunistic Spectrum Access via Periodic Channel Sensing, IEEE Transactions on Signal Processing, vol. 56, No. 2, Feb. 2008.*

Long et al., "An Estimation Algorithm of Channel State Transition Probabilities for Cognitive Radio Systems," Cognitive Radio Oriented Wireless Networks and Communications, 2008, Crowncom 2008, 3$^{rd}$ International Conference on IEEE Piscataway, NJ, USA, pp. 1-4, XP031285109 (May 15, 2008).

Liu et al., "Optimizing Energy Consumption with Transmission Pushbacks in Sensor Networks," [online] 2008, pp. 1-11, XP002573096, retrieved from the Internet: URL: http://citeseerx.ist.psu.edu/viewdoc/summary?doi=10.1.1.118.4182> (2008).

Zhao et al., "Decentralized Cognitive MAC for Opportunistic Spectrum Access in Ad Hoc Networks: A POMDP Framework," IEEE Journal on Selected Areas in Communications, IEEE Service Center, Piscataway, US, vol. 25, No. 3, pp. 589-600, XP011177058 (Apr. 1, 2007).

Ercan et al., "A Revenue Enhancing Stackelberg Game for Owners in Opportunistic Spectrum Access," New Frontiers in Dynamic Spectrum Access Networks, Dyspan, 3$^{rd}$ IEEE Symposium on, IEEE, Piscataway, NJ, USA, pp. 1-8. XP031353252 (Oct. 14, 2008).

Zhao et al., "Opportunistic Spectrum Access via Periodic Channel Sensing," IEEE Transactions on Signal Processing, vol. 56, No. 2, pp. 785-796 (Feb. 2008).

Xing et al., "Dynamic Spectrum Access in Open Spectrum Wireless Networks," DRAFT—Department of Electrical and Computer Engineering, Stevens Institute of Technology, Hoboken, NJ 07030, pp. 1-20 (Jan. 15, 2005).

State Intellectual Property Office of the People's Republic of China, International Search Report in International Patent Application No. PCT/CN2009/076167 (Jan. 6, 2009).

European Patent Office, Extended Search Report in European Application No. 10150127.8 (Mar. 31, 2010).

International Search Report in corresponding International Patent Application No. PCT/CN2009/076167 (Apr. 1, 2010).

Written Opinion of the International Searching Authority in corresponding International Patent Application No. PCT/CN2009/076167 (Apr. 1, 2010).

1$^{st}$ Office Action in corresponding Chinese Patent Application No. 200910001371.0 (Jul. 3, 2012).

\* cited by examiner

METHOD AND APPARATUS FOR SPECTRUM ACCESS OF SECONDARY USERS IN COGNITIVE RADIO SYSTEM

CROSS-REFERENCE TO RELATED APPLICATION

This application claims priority to Chinese Patent Application No. 200910001371.0, filed on Jan. 6, 2009, which is hereby incorporated by reference in its entirety.

FIELD OF THE INVENTION

The present invention relates to the network communication field, and in particular, to a method and apparatus for spectrum access of secondary users in a cognitive radio system.

BACKGROUND OF THE INVENTION

In a radio communication system, radio spectrums are the most important resources. Spectrums in existing networks are classified by the Radio Regulatory Commission according to different communication systems. Under such restrictions, many spectrum resources are not fully used. Communication rates of systems are restricted by their limited available spectrum bandwidths. Therefore, the Cognitive Radio (CR) system is proposed in existing technologies to make better use of radio spectrum resources.

Users in a CR system are usually classified into primary users and secondary users. A primary user owns radio spectrum resources. A secondary user can use spectrum holes in the channels of a primary user to send or receive data in the case that the communication of the primary user is not affected or that the impacts on the communication are within a specified threshold.

Figure 1:
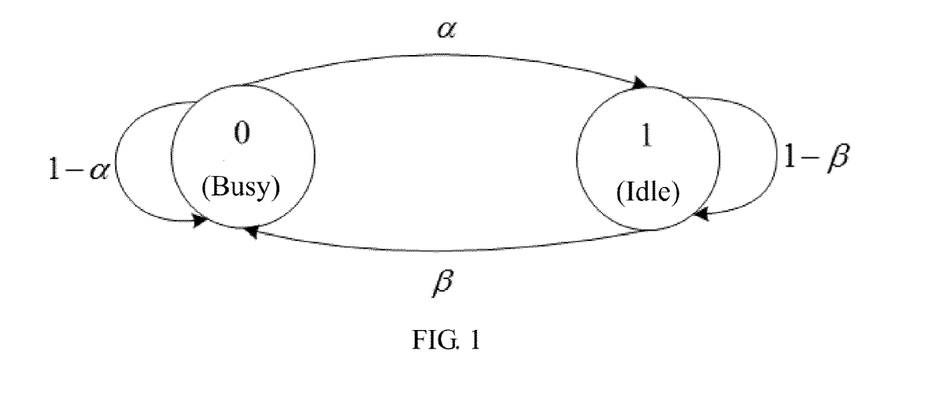
FIG. 1 shows a structural diagram of the discrete-time Markov model in the prior art.
Figure 2:
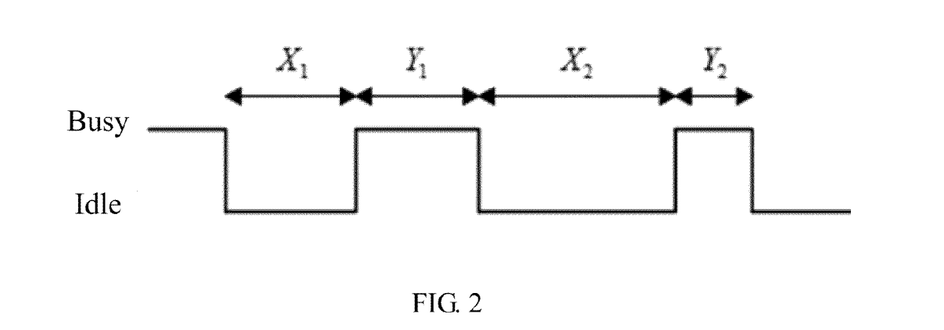
FIG. 2 shows a structural diagram of the continuous-time Markov model in the prior art.

In a CR system, common channel state models include a discrete-time Markov model and a continuous-time Markov model. FIG. 1 shows a structural diagram of the discrete-time Markov model. The state transition probability of the discrete-time Markov model includes the probabilities of the state changing from 0 to 1 and from 1 to 0, which can be represented by $\alpha$ and $\beta$. FIG. 2 shows the continuous-time Markov model. The idle time of a channel is represented by X ($X_1, X_2 \ldots$) as shown in FIG. 2. The busy time of a channel is represented by Y ($Y_1, Y_2 \ldots$) as shown in FIG. 2. The idle time and busy time of a channel are exponentially distributed.

Figure 3:
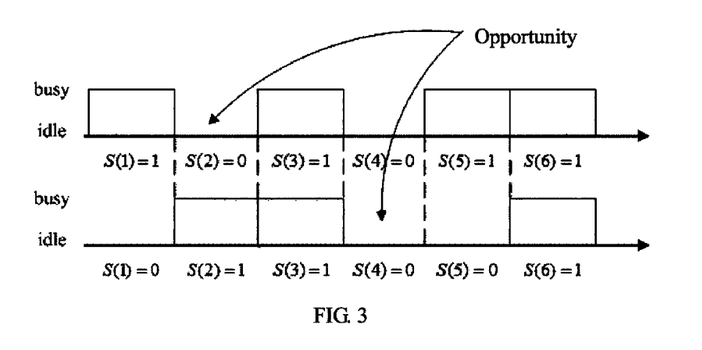
FIG. 3 shows a schematic diagram of spectrum holes in the discrete-time Markov model in the prior art.

In the prior art, secondary users based on the Markov model need to estimate the channel usage of primary users and then select a channel according to the channel usage. That is, secondary users use the spectrum holes of channels of primary users to send or receive data. Take the discrete-time Markov model as an example. FIG. 3 shows a schematic diagram of the discrete-time Markov model and the channel usage of two primary users. For primary channel 1, time slots 2 and 4 are spectrum holes. For primary channel 2, time slots 1, 4, and 5 are spectrum holes. In this case, secondary users can use the preceding spectrum holes to send or receive data.

In the preceding solution in the prior art, the parameters of the Markov model are supposed to be known and constant. In actual application scenarios of the CR, multiple primary channels may be available for selection. Secondary users, however, may not know the channel parameters of the models used by the primary channels. In this case, the prior art may not select an optimum primary channel for access, thus affecting the system performance.

SUMMARY OF THE INVENTION

Embodiments of the present invention provide a method and apparatus for spectrum access of secondary users in a CR system. With the method and apparatus, an optimum primary channel may be selected from multiple primary channels by estimating channel parameters to satisfy high data transmission requirements and improve system performance.

A method for spectrum access of secondary users in a CR system includes:

estimating channel parameters of a primary channel according to the Markov model used by the primary channel;

selecting a primary channel with the largest available bandwidth according to the estimated channel parameters when multiple primary channels exist;

detecting the selected primary channel; and accessing the primary channel to transmit data when the channel is idle.

An apparatus for spectrum access of secondary users in a CR system includes:

a parameter estimating unit, configured to estimate channel parameters of a primary channel according to the Markov model used by the primary channel;

a channel selecting unit, configured to select a primary channel with the largest available bandwidth according to the channel parameters estimated by the parameter estimating unit when multiple primary channels exist;

a channel detecting unit, configured to detect the primary channel selected by the channel selecting unit; and an accessing unit, configured to access the primary channel to transmit data when the channel is idle.

A system for spectrum access of secondary users in a CR system includes a secondary user and a primary user.

The secondary user is configured to: estimate parameters of a primary channel according to the Markov model used by the primary channel, select a primary channel that has the largest available bandwidth according to the estimated channel parameters when multiple primary channels exist, detect the selected primary channel, and access the primary channel to transmit data when the channel is idle.

The primary user is configured to transmit data with its radio spectrum resources.

It can be seen from the technical solutions of the embodiments of the present invention that a secondary user estimates the parameters of a primary channel according to the Markov model used by the primary channel, selects a primary channel that has the largest available bandwidth according to the estimated channel parameters when multiple primary channels exist, detects the selected primary channel, and accesses the primary channel to transmit data when the channel is idle. Therefore, an optimum primary channel can be selected from multiple primary channels by estimating channel parameters to satisfy high data transmission requirements and improve system performance.

DETAILED DESCRIPTION OF THE EMBODIMENTS

The embodiments of the present invention provide a method and apparatus for spectrum access of secondary users in a CR system, in which a secondary user selects an optimum primary channel from multiple primary channels by estimating channel parameters to satisfy high data transmission requirements and improve system performance.

Figure 4:
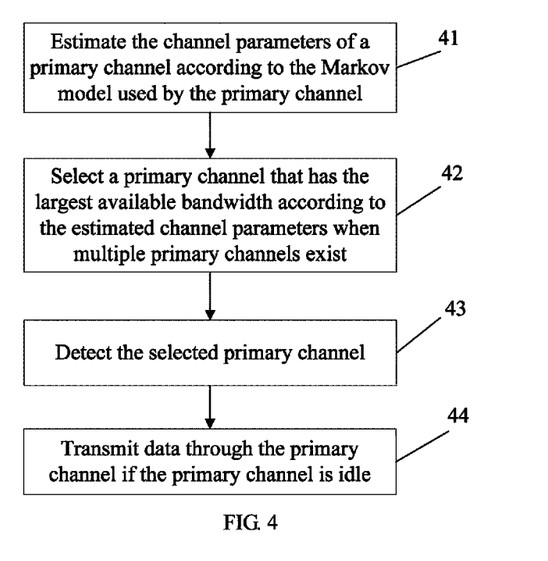
FIG. 4 shows a flowchart illustrating a method for spectrum access of secondary users according to a first embodiment of the present invention.

FIG. 4 shows a flowchart illustrating a method for spectrum access of secondary users according to the first embodiment of the present invention. The method includes:

Step 41: estimating channel parameters of primary channels according to the Markov model used by the primary channels. Further, the process for estimating the channel parameters of each primary channel includes: selecting an estimating method according to the Markov model used by the primary channel, and estimating channel parameters of the primary channel accordingly. In the embodiment of the present invention, the Markov model used by the primary channel may be the discrete-time Markov model or continuous-time Markov model.

Taking the continuous-time Markov model as an example, the estimation of channel parameters includes the following process:

First, obtaining specific number of samples according to the estimation precision required by the system and the standard normal distribution function, wherein the estimation precision required by the system includes relative estimation error and confidence probability. The relative estimation error and confidence probability may be set according to the precision requirements of vendors. In the embodiment of the present invention, the specific number of samples is calculated as follows:

$$r = \frac{1}{\delta^2}\left[\Phi^{-1}\left(\frac{P_C+1}{2}\right)\right]^2 \quad (1.1)$$

In formula 1.1, $\delta$ is the relative estimation error; $P_C$ is the confidence probability; and $\phi(\bullet)$ is the standard normal distribution function. For example, if $\delta$ is set to 1% and $P_C$ is set to 99%, the number of samples can be calculated according to formula 1.1:

r=25758.

Second, performing sampling according to the specific number of samples r to obtain overall sampling result, and obtaining channel parameter $\lambda_X$, $\lambda_Y$ (unit: Hz) with the precision required by the system according to the number of samples and overall sampling result. In the embodiment of the present invention, the channel parameters are calculated as follows:

$$\lambda_X = \frac{r}{x_1+x_2+\ldots+x_r} = \frac{r}{\sum_{k=1}^{r} x_k} \quad (1.2)$$

$$\lambda_Y = \frac{r}{y_1+y_2+\ldots+y_r} = \frac{r}{\sum_{k=1}^{r} y_k}$$

In formula 1.2, r is the total samples of X and Y, which may be the calculated specific number of samples; $X=(x_1, x_2, \ldots)$ and $Y=(y_1, y_2, \ldots)$ are the overall sampling result, that is, the observation sequence.

If the primary channel uses the discrete-time Markov model, the estimation of channel parameters includes the following process:

Performing sampling according to number of initial sample. for example, in the embodiment of the present invention, the number of initial sample is 100, and obtaining rough channel parameters according to the sampling result. In the embodiment of the present invention, the rough channel parameters are calculated as follows:

$$\begin{cases} \alpha = n_1/(n_0+n_1) \\ \beta = n_2/(n_2+n_3) \end{cases} \quad (2.1)$$

In formula 2.1, $n_0$, $n_1$, $n_2$, and $n_3$ respectively stand for the times of four kinds of one-step transition of the primary channel state, wherein the kinds of the one-step transition include (0,0), (0,1), (1,0), (1,1). The total number of the four kinds of one-step transitions is the initial number of samples. For example, according to formula 2.1, when the sampling result is $n_1=2$, $n_0=38$, $n_2=5$, and $n_3=55$, then the estimated channel parameters are: $\alpha=0.05$, and $\beta=0.08$.

Obtaining specific number of samples required by the system according to the rough channel parameters, the estimation precision required by the system, and the standard normal distribution function, where, estimation precision required by the system includes relative estimation error and confidence probability. The relative estimation error and confidence probability may be set according to the precision requirements of vendors. In the implementation, the specific number of samples may be calculated as follows:

$$r_\alpha = \frac{\left[\Phi^{-1}\left(\frac{P_C^\alpha+1}{2}\right)\right]^2}{\delta_\alpha^2}(1-\alpha)\left(\frac{1}{\alpha}+\frac{1}{\beta}\right) \quad (2.2)$$

$$r_\beta = \frac{\left[\Phi^{-1}\left(\frac{P_C^\beta+1}{2}\right)\right]^2}{\delta_\beta^2}(1-\beta)\left(\frac{1}{\alpha}+\frac{1}{\beta}\right)$$

$$r_1 = \max(r_\alpha, r_\beta)$$

In formula 2.2, $\delta_\alpha$ and $\delta_\beta$ are relative estimation errors; $P_C^\alpha$ and $P_C^\beta$ are confidence probabilities; $\phi(\bullet)$ is the standard normal distribution function; $r_\alpha$ and $r_\beta$ are the specific number of samples required by rough channel parameters $\alpha$ and $\beta$ under corresponding estimation precision; $r_1$ is the specific number of samples required by the system under corresponding estimation precision. For example, if $\delta_\alpha$ is set to 0.05, $P_C^\alpha$ is set to 99%, and $\alpha$ is 0.05 and $\beta$ is 0.08 according to the preceding estimation, then the number of samples may be obtained:

$r_\alpha=31811$

Similarly, if $\delta_\beta$ is set to 0.05, $P_C^\beta$ is set to 99%, and $\alpha$ is 0.05 and $\beta$ is 0.08 according to the preceding estimation, the number of samples is:

$$r_\beta = 30807$$

Performing left sampling according to the specific number of samples required by the system, and the number of initial sample which has been performed, and further, obtaining overall sampling result, wherein the number of the left sampling is obtained by deducting the initial number of samples from the specific number of samples required by the system.

Obtaining the channel parameter with the precision required by the system according to the specific number of samples and overall sampling result. In the embodiment, the calculation of the channel parameters is also performed according to formula 1.2. For example, if the specific number of samples $r_\alpha$ is 31811 and $r_\beta$ is 30807, and sampling has been performed for 100 times, 31711 more samples should be collected for the channel parameter $\alpha$ to satisfy the estimation precision required by the system.

Step 42: selecting a primary channel with the largest available bandwidth according to the estimated channel parameters when multiple primary channels exist.

If multiple primary channels need to be estimated, the process of channel selection is added. Specifically, the estimated channel parameters are used to select a primary channel with the largest available bandwidth.

In the embodiment of the present invention, if these primary channels use the continuous-time Markov model, a primary channel with the largest available bandwidth may be selected according to the bandwidths and channel parameters of these primary channels, the primary channel with the largest available bandwidth is confirmed according to the formula 3.1:

$$i_* = \arg\max_{i=1,\ldots,N} \frac{\frac{1}{\lambda_{yi}}}{\left(\frac{1}{\lambda_{xi}} + \frac{1}{\lambda_{yi}}\right)} B_i \quad (3.1)$$

In formula 3.1, $B_i$ is the bandwidth of the primary channel i; $\lambda_{xi}$ and $\lambda_{yi}$ are channel parameters of the primary channel i. For example, if five primary channels are available for selection, after the channel parameters of the five primary channels are estimated, bandwidths of the five primary channels may be calculated accordingly. The primary channel with the largest available bandwidth is the selected primary channel.

If the primary channels use the discrete-time Markov model, the primary channel with the largest available bandwidth is selected according to the bandwidths of the primary channels, the probability that a secondary user uses a primary channel, and the channel parameters of these primary channels. In the embodiment, the primary channel with the largest available bandwidth is confirmed according to the formula 3.2:

$$i_* = \arg\max_{i=1,\ldots,N} (\mu_i \beta_i + (1-\mu_i)\alpha_i) B_i \quad (3.2)$$

In formula 3.2, $B_i$ is the bandwidth of the primary channel i; $\mu_i$ is the probability that a secondary user uses the primary channel i; $\alpha_i$ and $\beta_i$ are channel parameters of the primary channel i. Similarly, if multiple primary channels are available for selection, after the channel parameters $\alpha,\beta$ of the multiple primary channels are estimated, bandwidths of the primary channels may be calculated according to the formula. The primary channel with the largest available bandwidth is the selected primary channel. In addition, when formula 3.2 is used:

$$\mu_i(t) = \begin{cases} 1 & \text{if } a(t)=i, \Theta_a(t)=1 \\ 0 & \text{if } a(t)=i, \Theta_a(t)=0 \\ \mu_i(t-1)\beta_i + (1-\mu_i(t-1))\alpha_i & \text{if } a(t) \neq i \end{cases}$$

In the preceding formula, a(t) is the channel index observed by the system at timeslot t; $\Theta_a(t)$ is the observation result of channel at timeslot t. When the channel is busy, the value of $\Theta_a(t)$ is 1; when the channel is idle, the value is 0. Meanings of other parameters are the same as those in formula 3.2. The preceding formula periodically modifies the states of channels at each timeslots according to historical and current observation results.

Step 43: detecting the selected primary channel.

After estimating the parameters of the primary channel, detect the primary channel to judge whether the channel is idle.

Step 44: transmitting data through the primary channel if the channel is idle.

The secondary user starts the detection of the primary channel. If the channel is occupied, the secondary user continues the detection. If the channel is idle, the secondary user uses the idle channel to transmit data.

If the primary channel uses the continuous-time Markov model, the duration of data transmission is obtained according to the maximum threshold of the conflict probability produced by the use of the primary channel by the secondary user that is constrained by the set spectrum etiquette, the set correction factor, the set detection duration, and the estimated channel parameters. In the embodiment, the duration of data transmission is calculated as follows:

$$T_P = \min\left(\frac{\sqrt{T_D^2 + \frac{4T_D}{\lambda_X}} - T_D}{2}, \gamma_P \cdot \left[\frac{1}{\lambda_X}\ln\left(\frac{1}{1-\eta}\right)\right]\right) \quad (1.3)$$

In formula 1.3, $\eta$ is the maximum threshold of the conflict probability coursed by the use of the primary channel by the secondary user that is constrained by the preset spectrum etiquette; $\gamma_P$ is the correction factor and complies with the condition of $\gamma_P \in (0,1)$. The correction factor may be set according to the estimation error and channel burst to provide protection of $1/\gamma_P - 1$ for the relative estimation error. It may also suppress the abrupt increase of the conflict probability caused by the abrupt change of channel parameters. $T_D$ is the detection duration; $\lambda_X$ is the estimated channel parameters. For example, based on formula 1.2, $\lambda_X$ is 1 Hz. If $\eta$ is set to 0.2, $\gamma_P$ is set to 0.9, and $T_D$ is 2 s, then according to formula 1.3, $T_P$ is 0.2008 s.

After the secondary user transmits data through the idle channel, the channel may be detected again for the next data transmission.

In addition, if the primary channel uses the discrete-time Markov model, the duration of the data transmission is the timeslot length of the discrete-time Markov model.

Through the implementation of the preceding technical solution, a secondary user obtains the spectrum holes of a primary channel when the channel parameters of the primary channel model are unknown. When multiple primary channels are available, an optimum primary channel may be selected from multiple primary channels by estimating channel parameters to satisfy high data transmission requirements and improve system performance. The secondary user detects only the optimum primary channel. Therefore, the detection workload is reduced.

In addition, if the primary channel uses the continuous-time Markov model, after the estimation of the channel parameters of the primary channel, the secondary user monitors the probability $P_R$ of the latest conflicts when using the primary channel. If the probability $P_R$ exceeds preset characteristic value, the channel parameters of the continuous-time Markov model are marked as unavailable and the channel parameters are re-estimated.

The set characteristic value may be obtained according to the estimated channel parameters and the data transmission duration. In the embodiment of the present invention, the characteristic value is set in a range of $[aP_1, bP_1]$, in which a is greater than 0 and smaller than 1 and b is greater than 1. The parameter $P_1$ may be obtained according to the formula $P_f = P(X \leq T_P) = 1 - e^{-\lambda_X T_P} \leq \eta$. In the formula, meanings of $T_P$, $\eta$ and $\lambda_X$ are the same as those in formula 1.3. For example, according to formula 1.2, $\lambda_X$ is 1 Hz. According to formula 1.3, $T_P$ is 0.2008 s. If $\eta$ is 0.2, then according to the preceding formula, $P_f$ is equal to 0.1819. Therefore, the range of the characteristic value is obtained.

The estimation of channel parameters may be restarted by monitoring the channel model when the channel parameters change constantly. Therefore, spectrum holes of the primary channel may be obtained for data transmission, thus improving system performance.

Figure 5A:
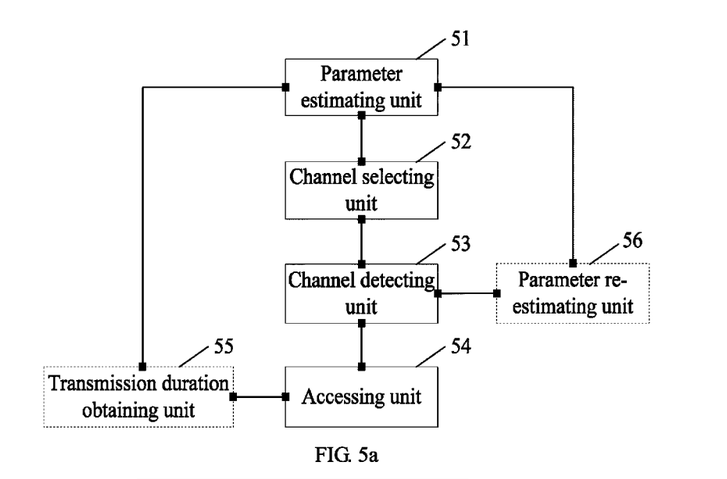
FIG. 5a shows a structural diagram of an apparatus for spectrum access of secondary users according to a second embodiment of the present invention.

The second embodiment of the present invention provides an apparatus for spectrum access of secondary users in the CR system. FIG. 5a shows a structural diagram of the apparatus. The apparatus includes a parameter estimating unit 51, a channel selecting unit 52, a channel detecting unit 53, and an accessing unit 54.

The parameter estimating unit 51 is configured to estimate the channel parameters of a primary channel according to the Markov model used by the primary channel. For details on the method for estimating channel parameters, see the description of the first embodiment of the present invention.

The channel selecting unit 52 is configured to select a primary channel with the largest available bandwidth according to the channel parameters estimated by the parameter estimating unit 51 when multiple primary channels exist.

The channel detecting unit 53 is configured to detect the primary channel selected by the channel selecting unit 52.

The accessing unit 54 is configured to access the idle channel detected by the channel detecting unit 53 to transmit data.

Figure 5B:
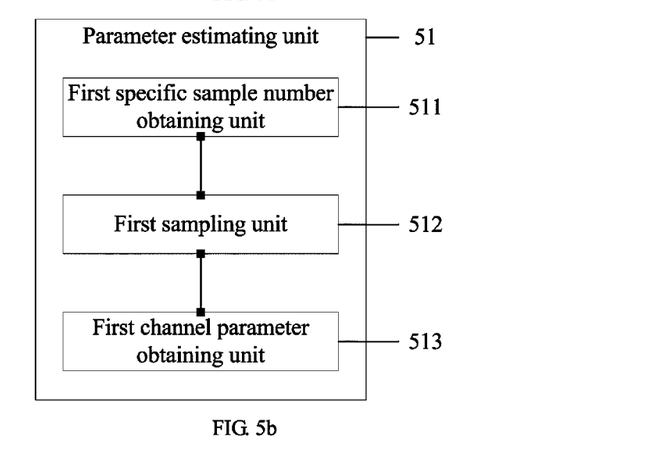
FIG. 5b shows a first schematic diagram of a parameter estimating unit of the apparatus according to the second embodiment of the present invention.

As shown in FIG. 5b, the parameter estimating unit 51 may further include:

a first sample number obtaining unit 511, configured to obtain the specific sample number according to the relative estimation error required by the system, confidence probability, and standard normal distribution function, when the continuous-time Markov model is used by the primary channel;

a first sampling unit 512, configured to: perform sampling according to the obtained sample number and obtain the overall sampling result; and a first channel parameter obtaining unit 513, configured to obtain channel parameters required by the system according to the specific sample number and overall sampling result.

Figure 5C:
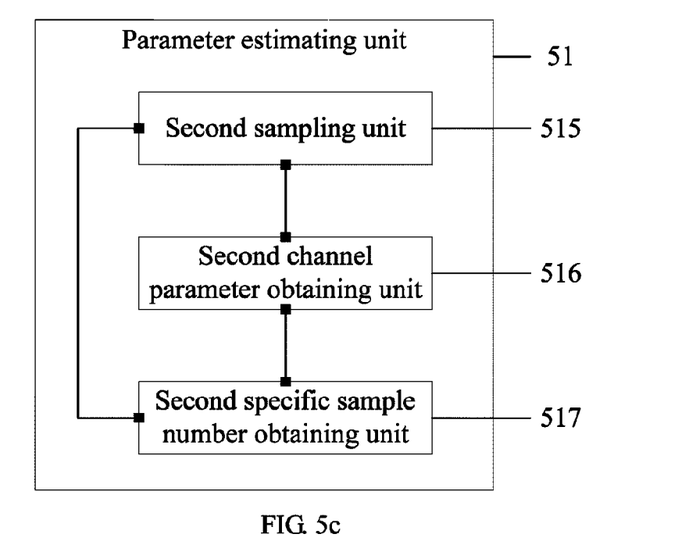
FIG. 5c shows a second schematic diagram of a parameter estimating unit of the apparatus according to the second embodiment of the present invention.

Or, as shown in FIG. 5c, the parameter estimating unit 51 may further include:

a second sampling unit 515, configured to obtain the initial sampling result by sampling according to the preset initial sample number and obtain sampling result by sampling according to the result of the specific sample number minus the initial sample number;

a second channel parameter obtaining unit 516, configured to: obtain rough channel parameters according to the number of transitions of channel states under the sampling result obtained according to the initial sample number, or obtain the channel parameters required by the system according to the number of transitions of channel states under the overall sampling result obtained according to the result of the specific sample number minus the initial sample number and deliver the channel parameters to other units;

a second specific sample number obtaining unit 517, configured to obtain the specific sample number according to the rough channel parameters, relative estimation error, confidence probability, and standard normal distribution function.

In the embodiment of the present invention, the apparatus further includes: a transmission duration obtaining unit 55, configured to obtain the data transmission duration according to the maximum threshold of the conflict probability produced by the use of the primary channel by the secondary user that is constrained by the set spectrum etiquette, the set correction factor, the set detection duration, and the channel parameters estimated by the parameter estimating unit 51 when the primary channel uses the continuous-time Markov model.

The apparatus may further include: a parameter re-estimating unit 56, configured to monitor the probability of the latest conflicts after the idle primary channel is accessed to transmit data when the primary channel uses the continuous-time Markov model, in which if the probability exceeds the set characteristic value, the channel parameters of the continuous-time Markov model are marked as unavailable and the channel parameters are re-estimated. The parameter re-estimating unit 52 and access unit 54 are parallel units. That is, after detecting the channel, the channel detecting unit 53 simultaneously triggers the parameter re-estimating unit 56 and accessing unit 54. For details on the method for re-estimating channel parameters, see the description of the first embodiment of the present invention.

Figure 6:
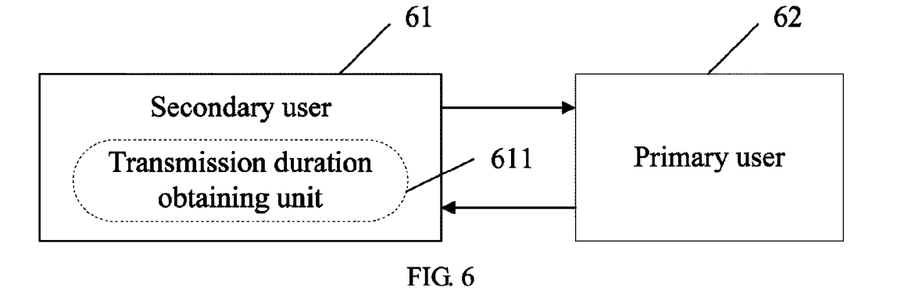
FIG. 6 shows a structural diagram of a system according to a third embodiment of the present invention.

The third embodiment of the present invention provides a system for spectrum access of secondary users in the CR system. FIG. 6 shows a structural diagram of the system. The system includes a secondary user 61 and a primary user 62.

The secondary user 61 is configured to: estimate the parameters of a primary channel according to the Markov model used by the primary channel, select a primary channel that has the largest available bandwidth according to the estimated channel parameters when multiple primary channels exist, detect the selected primary channel, and access the primary channel to transmit data when the channel is idle.

The primary user 62 is configured to transmit data with its radio spectrum resources.

The secondary user 61 further includes a transmission duration obtaining unit 611, which is configured to obtain the data transmission duration according to the estimated channel parameters, the maximum threshold of the conflict probability produced by the use of the primary channel by the secondary user that is constrained by the set spectrum etiquette, preset correction factor, and preset detection duration when the primary channel uses the continuous-time Markov model.

In addition, the secondary user 61 may serve as the spectrum access apparatus in the second embodiment of the present invention, including units of the spectrum access apparatus.

It should be noted that in the embodiments of the present invention, the units of the apparatus and system are divided logically and functionally and are not limited to the preceding division. Units that implement corresponding functions can be used herein. In addition, names of units are only for distinguishing and are not used to limit the scope of the present invention.

It is understandable to those skilled in the art that all or part of the steps in the method may be performed through hardware instructed by a program. The program may be stored in a computer-readable storage medium such as a read-only memory, a magnetic disk, and a compact disk.

To sum up, according to the embodiments of the present invention, an optimum primary may be selected from multiple primary channels by estimating channel parameters to satisfy high data transmission requirements and improve system performance.

Although the invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method for spectrum access, comprising:
   estimating channel parameters of primary channels according to the Markov model used by the primary channels;
   selecting a primary channel with a largest available bandwidth according to the estimated channel parameters; and
   detecting the selected primary channel, and transmitting data through the selected primary channel if the primary channel is idle;
   wherein if the Markov model used b the primary channel is discrete-time Markov model, the step of estimating the channel parameters of the primary channels according to the Markov model used b the primary channel comprises:
      performing sampling according to a number of an initial sample and obtaining rough channel parameters according to an initial sampling result;
      obtaining a specific number of samples required by the system according to the rough channel parameters estimation precision required by the system and standard normal distribution function;
      performing left sampling according to the specific number of samples required by the system, and the number of the initial sample which has been performed;
      obtaining an overall sampling result; and
      obtaining a channel parameter with the estimation precision required by the system according to the specific number of samples and the overall sampling result;
   wherein if the primary channels use a continuous-time Markov model, the primary channel with the largest available bandwidth is confirmed according to a formula of $$i_* = \arg\max_{i=1,\ldots,N} \frac{\frac{1}{\lambda_{yi}}}{\left(\frac{1}{\lambda_{xi}} + \frac{1}{\lambda_{yi}}\right)} B_i,$$

wherein, $B_i$ represents the bandwidth of the primary channel I, and $\lambda_{xi}$ and $\lambda_{yi}$ represents channel parameters of the primary channel I; and if the primary channels use a discrete-time Markov model, the primary channel with the largest available bandwidth is selected according to a formula of $$i_* = \arg\max_{i=1,\ldots,N} (\mu_i \beta_i + (1-\mu_i)\alpha_i) B_i$$

wherein $B_i$, represents the bandwidth of the primary channel i, $\mu_i$ represents probability that a secondary user uses the primary channel and i; $\alpha_i$ and $\beta_i$ represents channel parameters of the primary channel i.

2. The method according to claim 1, wherein if the Markov model used by the primary channel is continuous-time Markov model, the step of estimating the channel parameters of the primary channels according to the Markov model used by the primary channel comprises:
   obtaining the specific number of samples according to the estimation precision required by the system and the standard normal distribution function;
   performing the sampling according to the specific number of samples, and obtaining the overall sampling result; and
   obtaining the channel parameter with the precision required by the system according to the specific number of samples and the overall sampling result.

3. The method according to claim 2, wherein the estimation precision required by the system comprises relative estimation error and confidence probability.

4. The method according to claim 2, wherein the specific number of samples is calculated according to a formula of $$r = \frac{1}{\delta^2}\left[\Phi^{-1}\left(\frac{P_C+1}{2}\right)\right]^2$$

wherein, r represents the specific number of samples, $P_c$ represents confidence probability, $\Phi(\cdot)$ represents standard normal distribution function.

5. The method according to claim 2, wherein the channel parameters are calculated according to formulas of $$\lambda_X = \frac{r}{x_1+x_2+\ldots+x_r} = \frac{r}{\sum_{k=1}^{r} x_k}$$

$$\lambda_Y = \frac{r}{y_1+y_2+\ldots+y_r} = \frac{r}{\sum_{k=1}^{r} y_k}$$

wherein, r represents the specific number of samples, $X=(x_1,x_2,\ldots)$ and $Y=(y_1 y_2,\ldots)$ are the overall sampling result, that is, the observation sequence.

6. The method according to claim 1, wherein the rough channel parameters are obtained according to a formula of $$\begin{cases} \alpha = n_1/(n_0 + n_1) \\ \beta = n_2/(n_2 + n_3) \end{cases} \quad 5$$

wherein, $n_0$, $n_1$, $n_2$, and $n_3$ respectively represent for times of four kinds of one-step transition of the primary channel state.

7. The method according to claim 1, wherein the estimation precision required by the system comprises relative estimation error and confidence probability.

8. The method according to claim 1, wherein the specific number of samples is obtained according to formulas of $$r_\alpha = \frac{\left[\Phi^{-1}\left(\frac{P_C^\alpha + 1}{2}\right)\right]^2}{\delta_\alpha^2}(1-\alpha)\left(\frac{1}{\alpha}+\frac{1}{\beta}\right)$$

$$r_\beta = \frac{\left[\Phi^{-1}\left(\frac{P_C^\beta + 1}{2}\right)\right]^2}{\delta_\beta^2}(1-\beta)\left(\frac{1}{\alpha}+\frac{1}{\beta}\right)$$

$$r = \max(r_\alpha, r_\beta)$$

wherein, $\delta_\alpha$ and $\delta_\beta$ represents the estimation errors, $P_c^\alpha$ and $P_c^\beta$ represents confidence probabilities, $\Phi(\bullet)$ represents the standard normal distribution function, $r_\alpha$ and $r_\beta$ respectively represents the specific number of samples required by parameters $\alpha$ and $\beta$ under corresponding estimation precision, r represents the specific number of samples required by the system under corresponding estimation precision.

9. The method according to claim 1, wherein the channel parameters are calculated according to formulas of $$\lambda_X = \frac{r}{x_1 + x_2 + \ldots + x_r} = \frac{r}{\sum_{k=1}^{r} x_k}$$

$$\lambda_Y = \frac{r}{y_1 + y_2 + \ldots + y_r} = \frac{r}{\sum_{k=1}^{r} y_k}$$

wherein, r represents the specific number of samples, $X=(x_1, x_2, \ldots)$ and $Y=(y_1, y_2, \ldots)$ are the overall sampling result, that is, the observation sequence.

10. The method according to claim 1, wherein the probability $\mu_i$, that a secondary user uses the primary channel i is calculated according to a formula of $$\mu_i(t) = \begin{cases} 1 & \text{if } a(t) = i, \Theta_a(t) = 1 \\ 0 & \text{if } a(t) = i, \Theta_a(t) = 0 \\ u_i(t-1)\beta_i + (1-\mu_i(t-1))\alpha_i & \text{if } a(t) \neq i \end{cases}$$

wherein, a(t) represents channel index observed by the system at timeslot t, $\Theta_a(t)$ is the observation result of channel at timeslot t.

11. The method according to claim 1, wherein if the primary channel with the largest available bandwidth uses the continuous-time Markov model, the duration of data transmission is obtained according to a formula of $$T_P = \min\left(\frac{\sqrt{T_D^2 + \frac{4T_D}{\lambda_X}} - T_D}{2}, \gamma_P \cdot \left[\frac{1}{\lambda_X}\ln\left(\frac{1}{1-\eta}\right)\right]\right)$$

wherein, $\eta$ represents maximum threshold of the conflict probability coursed by use of the primary channel by the secondary user that is constrained by preset spectrum etiquette; $\gamma_P$ represents correction factor and complies with the condition of $\gamma_P \in (0,1)$, $\gamma_P$ is set according to estimation error and channel burst to provide protection of $1/\gamma_P - 1$ for the relative estimation error, $T_D$ represents detection duration; $\lambda_X$ represents estimated channel parameter; if the primary channel uses the discrete-time Markov model, the duration of the data transmission is the timeslot length of the discrete-time Markov model.

12. The method according to claim 1, wherein if the primary channel uses the continuous-time Markov model, the method further comprises:
monitoring probability of the latest conflicts, if the probability exceeds a preset characteristic value, marking the channel parameters of the primary channel as unavailable, and re-estimating the channel parameters.

13. The method according to claim 12, wherein the characteristic value is set in a range of $[aP_1, bP_1]$, wherein a is greater than 0 and smaller than 1 and b is greater than 1, and the parameter $P_1$ is obtained according to the formula $$P_I = P(X \leq T_P) = 1 - e^{-\lambda_X T_P} \leq \eta,$$

the parameter $T_P$ represents duration of data transmission and is obtained according to a formula of $$T_P = \min\left(\frac{\sqrt{T_D^2 + \frac{4T_D}{\lambda_X}} - T_D}{2}, \gamma_P \cdot \left[\frac{1}{\lambda_X}\ln\left(\frac{1}{1-\eta}\right)\right]\right)$$

wherein, $\eta$ represents maximum threshold of the conflict probability coursed by use of the primary channel by the secondary user that is constrained by preset spectrum etiquette; $\gamma_P$ represents correction factor and complies with the condition of $\gamma_P \in (0,1)$, $\gamma_P$ is set according to estimation error and channel burst to provide protection of $1/\gamma_P - 1$ for the relative estimation error, $T_D$ represents detection duration; $\lambda_X$ represents estimated channel parameter; if the primary channel uses the discrete-time Markov model, the duration of the data transmission is the timeslot length of the discrete-time Markov model.

14. An apparatus for spectrum access, comprising:
a parameter estimating unit, configured to estimate channel parameters of primary channels according to Markov model used by the primary channel;
a channel selecting unit, configured to select a primary channel with the largest available bandwidth according to the channel parameters;
an accessing unit, configured to access the primary channel with the largest available bandwidth; and
a channel detecting unit, configured to detect the primary channel selected by the channel selecting unit, and the accessing unit only accesses idle primary channel detected by the channel detecting unit;

wherein if the Markov model used b the primary channel is discrete-time Markov model, the step of estimating the channel parameters of the primary channels according to the Markov model used by the primary channel comprises:

performing sampling according to a number of an initial sample, and obtaining rough channel parameters according to an initial sampling result;

obtaining a specific number of samples required by the system according to the rough channel parameters, estimation precision required by the system, and standard normal distribution function;

performing left sampling according to the specific number of samples required by the system, and the number of the initial sample which has been performed;

obtaining an overall sampling result; and obtaining a channel parameter with the estimation precision required by the system according to the specific number of samples and the overall sampling result;

wherein if the primary channels use a continuous-time Markov model, the primary channel with the largest available bandwidth is confirmed according to a formula of $$i_* = \arg\max_{i=1,\ldots,N} \frac{\frac{1}{\lambda_{yi}}}{\left(\frac{1}{\lambda_{xi}} + \frac{1}{\lambda_{yi}}\right)} B_i,$$

wherein, $B_i$, represents the bandwidth of the primary channel i, and $\lambda_{xi}$ and $\lambda_{yi}$ represents channel parameters of the primary channel i; and if the primary channels use a discrete-time Markov model, the primary channel with the largest available bandwidth is selected according to a formula of $$i_* = \arg\max_{i=1,\ldots,N} (\mu_i \beta_i + (1 - \mu_i)\alpha_i) B_i$$

wherein $B_i$ represents the bandwidth of the primary channel i, $\mu_i$ represents probability that a secondary user uses the primary channel i; $\alpha_i$ and $\beta_i$ represents channel parameters of the primary channel i.

15. The method according to claim 14, wherein if continuous-time Markov model is used by the primary channels, the parameter estimating unit comprises:

a first sample number obtaining unit, configured to obtain specific sample number according to relative estimation required by the system, confidence probability, and standard normal distribution function;

a first sampling unit, configured to perform sampling according to the specific sample number and overall sampling result accordingly;

a first channel parameter obtaining unit, configured to obtain channel parameters required by the system according to the specific sample number and overall sampling result.

16. The apparatus according to claim 14, wherein if discrete-time Markov model is used by the primary channel, the parameter estimating unit comprises:

a second sampling unit, configured to obtain initial sampling result according to preset initial sample number, and obtain sampling result according to result of the specific sample number minus the initial sample number;

a second channel parameter obtaining unit, configured to obtain rough channel parameters according to the initial sampling result, and obtain channel parameters required system according to number of transitions of channel states under the overall sampling result according to the result of the specific sample number minus the initial sample number;

a second specific sample number obtaining unit, configured to obtain the specific sample number according to the rough channel parameters, relative estimation error, confidence probability, and standard normal distribution function.

17. A system for spectrum access of secondary users in a Cognitive Radio (CR) system, wherein the system comprises:

a secondary user, configured to estimate parameters of primary channels according to Markov model used by the primary channel, select a primary channel with the largest available bandwidth according to the estimated channel parameters, and access the primary channel to transmit data when the channel is idle; and a primary user, configured to transmit data with its radio spectrum resources;

wherein if the Markov model used by the primary channel is discrete-time Markov model, the step of estimating the channel parameters of the primary channels according to the Markov model used by the primary channel comprises:

performing sampling according to a number of an initial sample, and obtaining rough channel parameters according to an initial sampling result;

obtaining a specific number of samples required by the system according to the rough channel parameters, estimation precision required by the system, and standard normal distribution function;

performing left sampling according to the specific number of samples required by the system, and the number of the initial sample which has been performed;

obtaining an overall sampling result; and obtaining a channel parameter with the estimation precision required by the system according to the specific number of samples and the overall sampling result;

wherein if the primary channels use a continuous-time Markov model, the primary channel with the largest available bandwidth is confirmed according to a formula of $$i_* = \arg\max_{i=1,\ldots,N} \frac{\frac{1}{\lambda_{yi}}}{\left(\frac{1}{\lambda_{xi}} + \frac{1}{\lambda_{yi}}\right)} B_i,$$

wherein, $B_i$ represents the bandwidth of the primary channel i, and $\lambda_{xi}$ and $\lambda_{yi}$ represents channel parameters of the primary channel i; and if the primary channels use a discrete-time Markov model, the primary channel with the largest available bandwidth is selected according to a formula of $$i_* = \arg\max_{i=1,\ldots,N} (\mu_i \beta_i + (1 - \mu_i)\alpha_i) B_i$$

wherein, $B_i$ represents the bandwidth of the primary channel i; $\mu_i$ represents probability that a secondary primary channel i; $\alpha_i$ and $\beta_i$ represents channel parameters of the primary channel i.

* * * * *

UNITED STATES PATENT AND TRADEMARK OFFICE
CERTIFICATE OF CORRECTION

PATENT NO. : 8,463,188 B2
APPLICATION NO. : 12/649926
DATED : June 11, 2013
INVENTOR(S) : Gan et al.

Page 1 of 1

It is certified that error appears in the above-identified patent and that said Letters Patent is hereby corrected as shown below:

In the Claims:

Column 9, line 44, "used b the primary channel" should read -- used by the primary channel --.

Column 9, line 47, "used b the primary channel" should read -- used by the primary channel --.

Column 13, line 1, "used b the primary channel" should read -- used by the primary channel --.

Column 14, line 61, "that a secondary primary" should read -- that a secondary user uses the primary --.

Signed and Sealed this
Thirteenth Day of August, 2013

Teresa Stanek Rea
*Acting Director of the United States Patent and Trademark Office*